United States Patent
Tanaka et al.

[11] Patent Number: 6,047,559
[45] Date of Patent: Apr. 11, 2000

[54] ABSORPTION COLD/HOT WATER GENERATING MACHINE

[75] Inventors: Syouji Tanaka; Takashi Kaneko; Teruwo Shiraishi, all of Kanagawa-ken, Japan

[73] Assignee: Ebara Corporation, Tokyo, Japan

[21] Appl. No.: 09/131,777

[22] Filed: Aug. 10, 1998

[30] Foreign Application Priority Data

Aug. 12, 1997 [JP] Japan ................................ 9-231844

[51] Int. Cl.$^7$ .................................................. F25B 15/00
[52] U.S. Cl. ........................ 62/476; 62/324.2; 62/141; 62/148
[58] Field of Search ................... 62/141, 148, 324.2, 62/476

[56] References Cited

U.S. PATENT DOCUMENTS

| | | | |
|---|---|---|---|
| 4,493,192 | 1/1985 | Hibino et al. | 62/141 |
| 4,534,180 | 8/1985 | Yasuda et al. | 62/141 |
| 5,447,042 | 9/1995 | Ohuchi et al. | 62/476 |
| 5,477,696 | 12/1995 | Takahata et al. | 62/148 |
| 5,592,825 | 1/1997 | Inoue | 62/141 |
| 5,617,733 | 4/1997 | Tomita et al. | 62/324.2 |
| 5,682,755 | 11/1997 | Uchida et al. | 62/148 |
| 5,752,388 | 5/1998 | Hoshino et al. | 62/141 |
| 5,829,260 | 11/1998 | Kojima et al. | 62/148 |

FOREIGN PATENT DOCUMENTS 2-233948  9/1990  Japan.

*Primary Examiner*—Henry Bennett
*Assistant Examiner*—Mark Shulman
*Attorney, Agent, or Firm*—Armstrong, Westerman, Hattori, McLeland & Naughton

[57] ABSTRACT

An absorption cold/hot water generating machine comprising a refrigerating cycle formed by pipe-connecting an evaporator, an absorber, a solution heat exchanger, a low-temperature generator, a condenser, a high-temperature generator, a solution pump, and a refrigerant pump; the solution pump being an inverter-driven pump; a header for receiving a return solution from the high-temperature generator; a level sensor for detecting the liquid level in the header; and control means for controlling the flow rate of the solution sent from the absorber to the high-temperature generator by controlling the operating frequency of the solution pump, thereby keeping the solution level in the header within a prescribed range; wherein the control means includes sampling mode setting means for setting a solution sampling mode in which the discharge side pressure of the solution pump is brought to over a prescribed pressure through control of the operating frequency thereof.

4 Claims, 4 Drawing Sheets

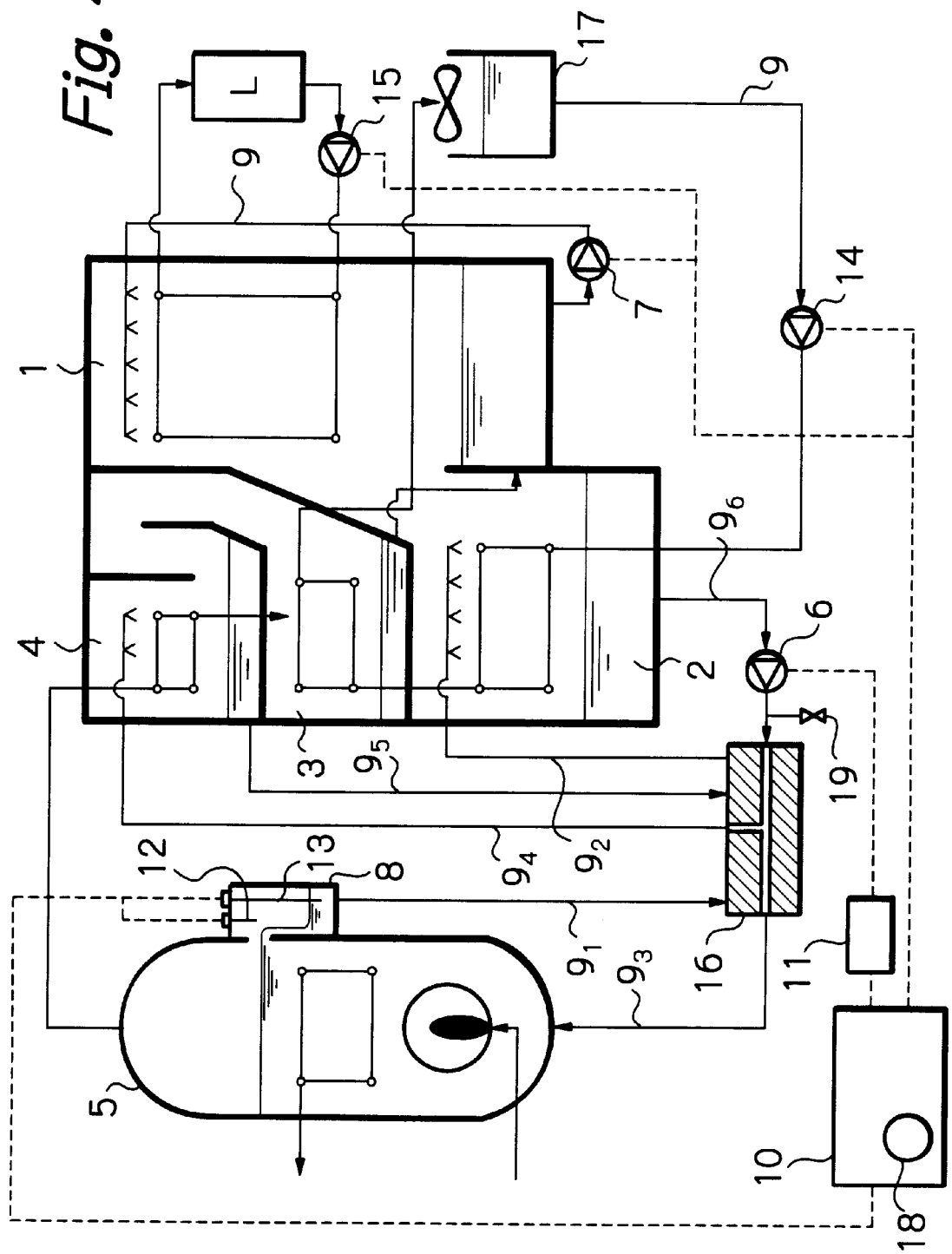

ABSORPTION COLD/HOT WATER GENERATING MACHINE

BACKGROUND OF THE INVENTION

The present invention relates to an absorption cold/hot water generating machine. More particularly, the present invention relates to an absorption cold/hot water generating machine which permits easy sampling of a solution (absorbing solution).

Among absorption cold/hot water generating machines of this type, one having a construction as shown in FIG. 4 is conventionally used. The conventional absorption cold/hot water generating machine comprises, as shown in FIG. 4, an evaporator 1, an absorber 2, a condenser 3, a low-temperature generator 4, a high-temperature generator 5, a solution pump 6, a refrigerant pump 7, a cooling water pump 14, a solution heat exchanger 16, and a cooling tower 17, with piping 9 for connecting these components.

In the absorption cold/hot water generating machine, usually, a refrigerant which is sprayed in the evaporator 1 by means of the refrigerant pump 7 evaporates in the evaporator 1, and takes heat from water sent from a load L by means of a cold/hot water pump 15, thereby producing cold water. Refrigerant vapor produced through evaporation in the evaporator 1 is absorbed, in the absorber 2, by a high-concentration solution fed from the high-temperature generator 5 through the piping $9_1$ and $9_2$ via the solution heat exchanger 16 and sprayed in the absorber 2 and the concentrated solution thus becomes a lower-concentration diluted solution.

The diluted solution in the absorber 2 is sent to the high-temperature generator 5 though the piping $9_6$ and $9_3$ via the heat exchanger 16, and to the low-temperature generator 4 through the piping $9_6$ and $9_4$ via the heat exchanger 16 by the solution pump 6, heated in the high-temperature generator 5 and the low-temperature generator 4, respectively, and sent back to the absorber 2 in the form of the concentrated solution to continue the refrigerating cycle. Cooling water in the cooling tower 17 is circulated by the cooling water pump 14 through the absorber 2, the condenser 3 and the cooling tower 17. The solution pump 6, the refrigerant pump 7, the cooling water pump 14 and the cold/hot water pump 15 are controlled by the controller 10. In FIG. 4, the reference numeral 11 is an inverter for driving the solution pump 6; 18 is a buzzer which sounds upon the occurrence of a problem in the absorption cold/hot water generator; and 19 is a sampling valve for taking out the absorbing solution.

In the high-temperature generator 5, the diluted solution sent from the absorber 2 by the solution pump 6 is heated, and the refrigerant is evaporated to produce the concentrated solution which flows into the header 8. The concentrated solution returns from the header 8 to the absorber 2 through the piping $9_1$ and $9_2$ and the solution heat exchanger 16. Electrodes 12 and 13 serving as liquid level sensors for detecting the liquid level are provided in the header 8. The electrode 12 is used for detecting a high level, and the electrode 13 is used for a low level.

The inverter 11 controls the operating frequency of the solution pump 6 in response to a command from the controller 10 to control the rotating speed of the solution pump 6, thereby controlling the flow rate of the diluted solution to be fed to the high-temperature generator 5. More specifically, when the solution level in the header 8 is lower than a predetermined minimum value, the inverter controls the solution pump 6 so as to increase the flow rate of dilute solution fed to the high-temperature generator 5. When the solution level in the header 8 is higher than a predetermined maximum value, the inverter controls the solution pump 6 so as to reduce the flow rate of diluted solution fed to the high-temperature generator 5. Thus, the solution level in the header 8 is kept within a certain range.

In order to inspect the operating condition of the absorption cold/hot water generating machine having the above-mentioned construction, it is necessary to detect a concentration of the diluted solution (absorbing solution). More specifically, it is the general practice to open a sampling valve 19 provided on the discharge side of the solution pump 6, take out the diluted solution into a container such as a measuring cylinder, and measure specific gravity and temperature of the diluted solution, thereby calculating the concentration of the diluted solution. It should be noted that, in sampling, the interior pressure of the absorption cold/hot water generating machine is usually lower than the atmospheric pressure.

In an absorption cold/hot water generating machine having the above construction, however, it is not easy to conduct sampling (extraction) of the diluted solution. That is, when an operating frequency of the solution pump 6 is low, the discharge pressure of the solution pump 6 does not exceed the atmospheric pressure. Thus, if the sampling valve 19 is opened in this state, air is immixed into the piping 9, thus causing the machine to become inoperable condition or to corrode. A common practice for solving this problem is to prepare a container such as a sampling tank, reduce the inner pressure of the container to a vacuum, and then open the sampling valve 19 to take a sample of the diluted solution into the container. This method of sampling is, however, problematic in that it consumes a considerable amount of time and labor.

There is also proposed a method of increasing the discharge pressure of the solution pump 6 by forcibly increasing the operating frequency of the solution pump 6 to thereby create a condition for sampling of the diluted solution. In this method, however, it is necessary to dispose a number of operators including one who monitors an overflow in the header 8, one who conducts sampling by operating the sampling valve 19 and one who controls the inverter 11 of the solution pump 6. In addition lack of cooperation among the plurality of operators may cause immixture of air into the piping 9 of the absorption cold/hot water generating machine due to sudden decrease in the operating frequency of the solution pump 6, stoppage of the solution pump 6 or a delay in closing of the sampling valve 19.

SUMMARY OF THE INVENTION

The present invention was made in view of the problems described above, and has as its object the provision of an absorption cold/hot water generating machine which permits sampling of the solution (absorbing solution) with a one-touch operation, and without the risk of overflow of the solution in the header on the refrigerant site and immixture of air into the piping by providing a sampling mode of solution in the operation of the solution pump.

To accomplish the above-mentioned object, according to a first aspect of the invention an absorption cold/hot water generating machine is provided, which comprises a refrigerating cycle formed by pipe-connecting an evaporator, an absorber, a solution heat exchanger, a low-temperature generator, a condenser, a high-temperature generator, a solution pump, and a refrigerant pump; the solution pump being an inverter-driven pump; a header for receiving a return solution from the high-temperature generator; a level sensor for detecting the liquid level in the header; and control means for controlling the flow rate of the solution sent from the absorber to the high-temperature generator by controlling the operating frequency of the solution pump, thereby keeping the solution level in the header within a prescribed range; wherein the control means includes sampling mode setting means for setting a solution sampling mode in which the discharge side pressure of the solution pump is brought to over a prescribed pressure through control of the operating frequency thereof.

According to a second aspect of the invention, in an absorption cold/hot water generating machine according to the first aspect, the sampling mode setting means compare a prescribed sampling operating frequency for obtaining the prescribed discharge pressure of the solution pump needed for solution sampling and a current operating frequency of the solution pump; select the current solution pump operating frequency as the solution pump operating frequency when [the current solution pump operating frequency≧the prescribed sampling operating frequency]; and select the prescribed sampling operating frequency as the solution pump operating frequency when [the current solution pump operating frequency<the prescribed sampling operating frequency].

According to a third aspect of the invention, in an absorption cold/hot water generating machine according to the first or second aspect, the level sensor for detecting the liquid level in the header comprises a low level sensor for detecting a low liquid level and a high level sensor for detecting a high liquid level; and the control means is provided with alarm-sampling mode stop means which issues an alarm when a first prescribed period of time has elapsed after the sampling mode is started by the sampling mode setting means or when the high level sensor of the header detects a high liquid level, and discontinue the sampling mode after lapse of a second prescribed period of time after issuance of the alarm.

According to a fourth aspect of the invention, in an absorption cold/hot water generating machine according to the third aspect, the alarm issued by the alarm-sampling mode stop means is discriminated from other alarms by effecting a change in the sound of a buzzer.

According to the first aspect of the invention, as described above, since a sampling mode setting means is provided for achieving a discharge pressure of the solution pump which is adapted to take a sample solution out of the machine, an absorption cold/hot water generating machine which permits sampling of the solution (absorbing solution) by a one-touch operation and is free from the risk of air immixture can be obtained.

According to the second aspect of the invention, since the sampling mode setting means provide the sampling mode by comparing the prescribed sampling operating frequency needed for sampling and the current operating frequency of the inverter, it is possible to provide a sampling mode in response to the current solution pump operating frequency, i.e., the current discharge pressure of the solution pump.

According to the third aspect of the invention since the alarm/sampling mode stop means issue an alarm after the lapse of a first period of time after the sampling mode is started by the sampling mode setting means, or when the high level sensor of the header detects a high liquid level, and the sampling mode is discontinued after the lapse of a second prescribed period of time after issuance of alarm, it is possible to avoid the risk, during sampling, of a decrease in the solution pump discharge pressure resulting in immixture of air and the overflow of the solution in the header.

According to the fourth aspect of the invention, since it is possible to discriminate the alarm issued by the alarm-sampling mode stop means from the other kinds of alarm by changing the sound, a buzzer normally provided for notifying a problem in the machine can be commonly used for the alarm-sampling mode stop means.

The above and other objects, feature and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 4 is a diagram illustrating the typical construction of a conventional absorption cold/hot water generating machine.

DESCRIPTION OF THE PREFERRED EMBODIMENTS

Figure 1:
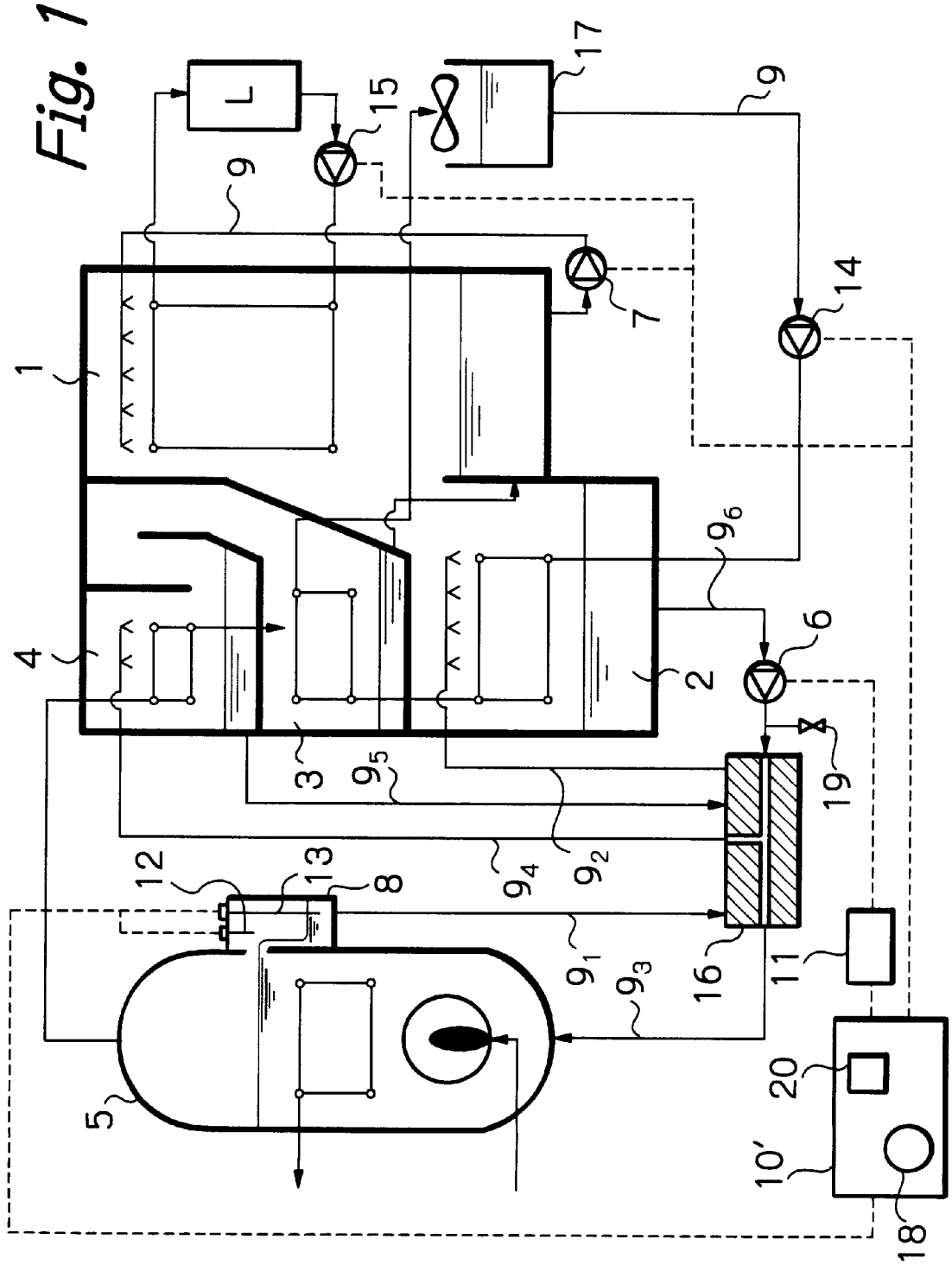
FIG. 1 is a diagram illustrating the construction of the absorption cold/hot water generating machine according to an embodiment of the present invention.

Some embodiments of the present invention will now be described with reference to the drawings. FIG. 1 is a diagram illustrating the construction of the absorption cold/hot water generating machine of the invention. In FIG. 1, the component having the same reference numerals as those shown in FIG. 4 represent the same or corresponding components, and the operation of the absorption cold/hot water generating machine is substantially the same as in the absorption cold/hot water generating machine shown in FIG. 4. Repetitive description is therefore omitted here. In FIG. 1, the reference numeral 20 is a pushbutton for starting the sampling mode of a solution pump 6 by the controller 10'.

Figure 2:
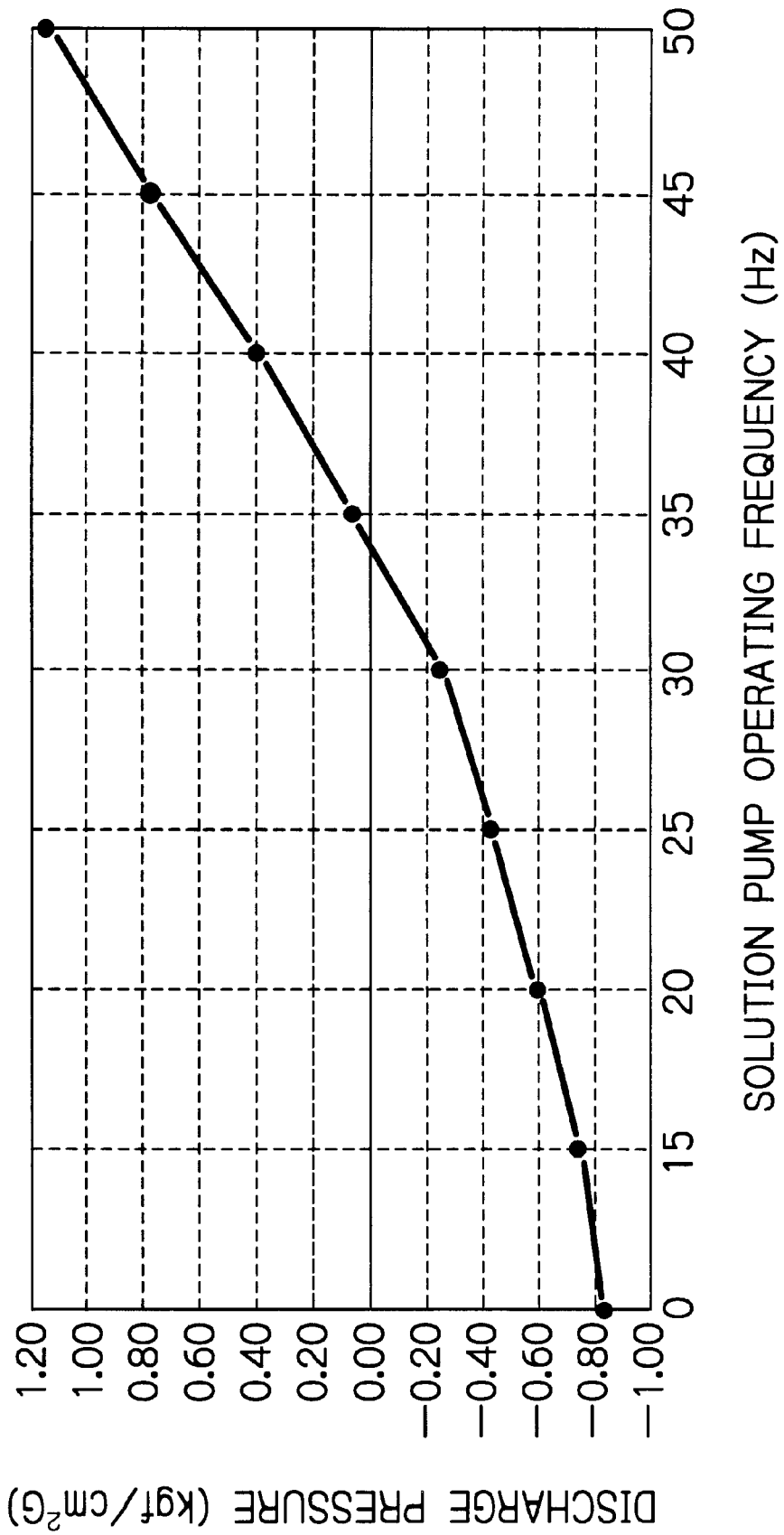
FIG. 2 is a graph illustrating the relationship between the solution pump operating frequency and the discharge pressure.

FIG. 2 is a graph illustrating the relationship between the operating frequency of the solution pump 6 and the discharge pressure. As shown in FIG.2, higher the operating frequency of the solution pump 6 is, higher the discharge pressure is. When sampling the diluted solution (absorbing solution), it is carried out by opening the sampling valve 19 provided on the discharge side of the solution pump 6. When the discharge pressure of the solution pump 6 is lower than the atmospheric pressure, therefore, air may be immixed in the piping 9.

It is, therefore, necessary at this point to bring the discharge pressure of the solution pump 6 to a pressure necessary for sampling of the solution, i.e., a pressure higher than the atmospheric pressure, when pressing the pushbutton 20 to switch over the operation of the solution pump 6 to the sampling mode. The controller 10' therefore controls the inverter 11 so that an operating frequency of the solution pump 6 exceeds a prescribed value, whereby the discharge pressure of the solution pump 6 becomes higher than the atmospheric pressure. However, since the relationship between the operating frequency of the solution pump 6 and the discharge pressure thereof varies depending on the physical properties of the solution and the inner pressure of the high-temperature generator 5, the pressure which permits sampling of the solution should be measured in before hand.

For example, in FIG. 2, the discharge pressure is 0.4 kgf/cm² near an operating frequency of about 40 Hz of the solution pump 6. It is, therefore, sufficient to set 40 Hz as the prescribed frequency for obtaining the solution pump discharge pressure needed for solution sampling (frequency for sampling operation). A low prescribed frequency value is desirable, because a sampling period can be made longer. However, if the frequency value is excessively low, it may drop lower than the atmospheric pressure. Thus, it is preferable to set within a range of from 0.3 to 0.5 kgf/cm²G with a margin. By this, it is possible to open the sampling valve 19 for sampling the solution without immixing an air. The time necessary for sampling, for example, is about 90 seconds.

There are various cases of operating conditions of the absorption cold/hot water generating machine when carrying out sampling, and among others, the following cases are conceivable:

(1) During stoppage;

(2) The current solution pump operating frequency is higher than the above-mentioned prescribed frequency (frequency for sampling operation);

(3) The current solution pump operating frequency is lower than the above-mentioned prescribed frequency (frequency for sampling oepration);

(4) Mixture of (2) and (3) above.

Figure 3:
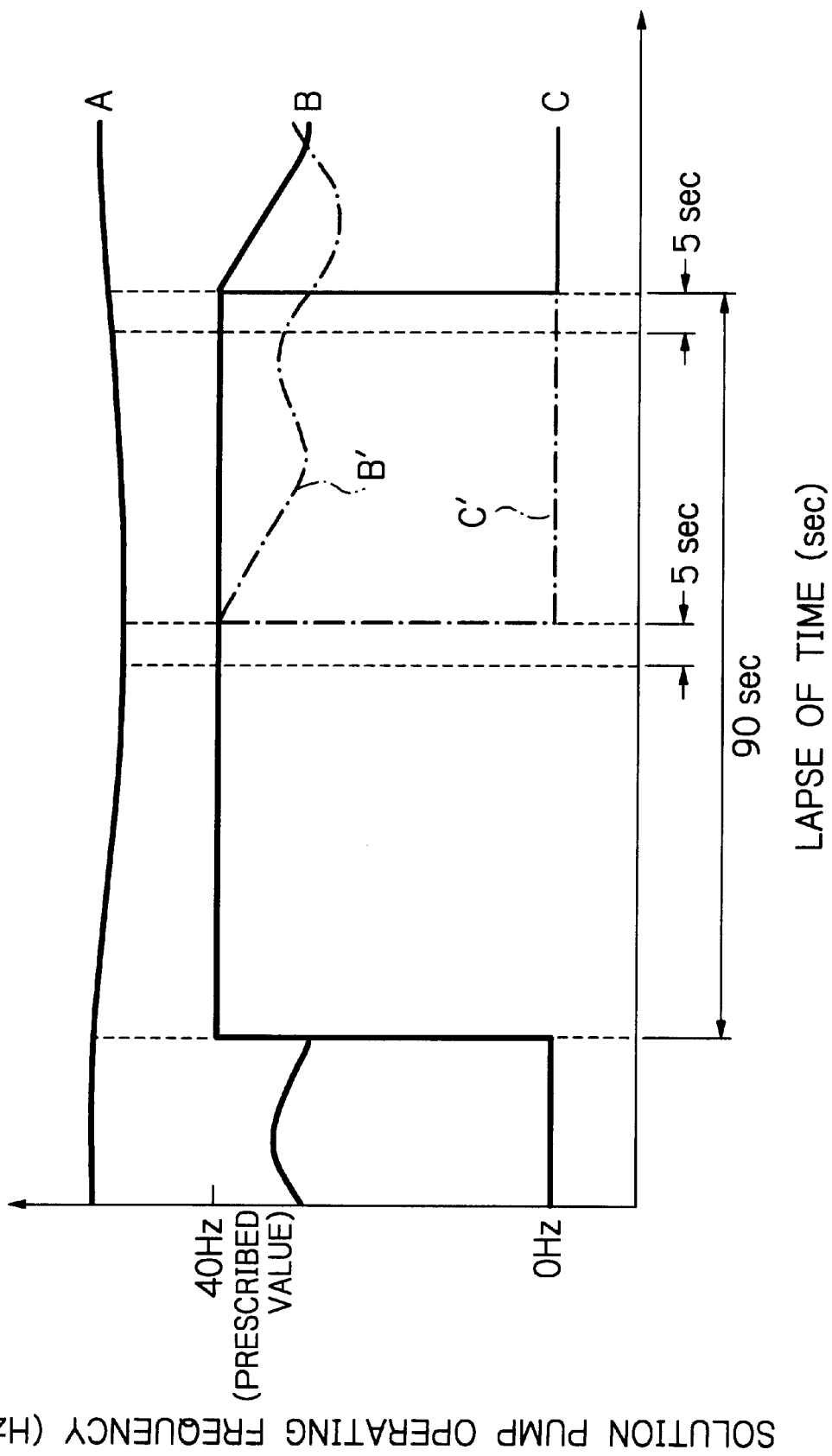
FIG. 3 is a graph illustrating the relationship between the solution pump operating frequency and the lapse of time in sampling mode.

When the current solution pump operating frequency is as in the case (2) above, i.e., higher than the prescribed frequency (for example, 40 Hz) such as 45 Hz, the operating frequency of the solution pump 6 should be kept at the current value since the discharge pressure of the solution pump 6 is higher than the atmospheric pressure which permits solution sampling (see curve A in FIG. 3).

When the current operating frequency of the solution pump 6 corresponds to any of the above cases (1), (3) and (4), i.e., for example, is lower than the above-mentioned prescribed frequency such as 35 Hz or OHz, the operating frequency of the solution pump 6 should be forcebly increased higher than the prescribed frequency (for example, 40 Hz). For a period of time necessary for sampling the solution, for example for 90 seconds, the solution pump 6 should be operated at this prescribed frequency (see curves B and C in FIG. 3).

After the lapse of a period of time necessary for sampling the solution, for example, 90 seconds, the operating frequency of the solution pump is returned to the original operating frequency. In such a case, however, if an operating frequency is suddenly decreased before the solution sampling is completed with the sampling valve 19 being left open, it allows immixture of air into the piping 9. Thus, five to ten seconds prior to the end of sampling mode, the buzzer is operated to beforehand inform the end of sampling mode, and the operator hearing buzzer sound closes the sampling valve 19. Usually, however, sampling will come to an end before sounding of the buzzer.

Particularly, in cases (1) and (3) above, since operation is effected forcebly at the above-mentioned prescribed frequency, for example, 40 Hz, it may cause an increase in liquid level in the header 8 receiving the flow of the return solution from the high-temperature generator 5, and continuing operation in this state may cause overflow of the solution on the refrigerant side. At this point, however, if the frequency is reduced or operation is stopped suddenly, air enter the piping 9 via the sampling valve 19 (probability of being in the middle of sampling in this case is higher than in returning the solution operating frequency to the original operating frequency after the lapse of the period of time necessary for sampling). Therefore, when an electrode 12 serving as the high level sensor of the header detects a high liquid level, the buzzer is sounded to signal closing the rampling valve 19, and after the lapse of a prescribed period of time (for example, for five to ten seconds), the sampling mode is stopped and the operating frequency of the solution pump 6 is reduced or operation is stopped (see curves B' and C' in FIG. 3).

The buzzer is normally provided as means for signalling a problem or the like in the machine. The buzzer may also serve as a means for providing an alarm in advance of the end of sampling mode and as a means for sounding an alarm due to a high liquid level of the header 8. The buzzer itself may be capable of emitting a different tone or of sounding intermittently to signal each of the foregoing alarm states. In the illustrated example, the electrodes 12 and 13 are adopted as sensor for detecting the liquid level in the header. The sensor for detecting the liquid level is not however limited thereto.

According to the invention, as described above, since sampling mode setting means is provided for achieving a discharge pressure of the solution pump which is adapted to take a sample solution out of the machine, an absorption cold/hot water generating machine which permits sampling of the solution (absorbing solution) by a one-touch operation and is free from the risk of air immixture can be provided.

What is claimed is:

1. An absorption cold/hot water generating machine comprising a refrigerating cycle formed by pipe-connecting an evaporator, an absorber, a solution heat exchanger, a low-temperature generator, a condenser, a high-temperature generator, a solution pump, and a refrigerant pump; said solution pump being an inverter-driven pump; a header for receiving a return solution from said high-temperature generator; a level sensor for detecting the liquid level in said header; and control means for controlling the flow rate of the solution sent from said absorber to said high-temperature generator by controlling the operating frequency of said solution pump, thereby keeping the solution level in said header within a prescribed range;

wherein said control means includes sampling mode setting means for setting a solution sampling mode in which the discharge side pressure of said solution pump is brought to over a prescribed pressure through control of the operating frequency thereof.

2. An absorption cold/hot water generating machine claimed in claim 1, wherein said sampling mode setting means compare a prescribed sampling operating frequency for obtaining the prescribed discharge pressure of said solution pump needed for solution sampling and a current operating frequency of the solution pump;

select the current solution pump operating frequency as the solution pump operating frequency when the current solution pump operating frequency≧said prescribed sampling operating frequency; and select said prescribed sampling operating frequency as the solution pump operating frequency when the current solution pump operating frequency<the prescribed sampling operating frequency.

3. An absorption cold/hot water generating machine claimed in claim 1 or 2, wherein said level sensor for detecting the liquid level in said header comprises a low level sensor for detecting a low liquid level and a high level sensor for detecting a high liquid level; and said control means is provided with alarm-sampling mode stop means which issues an alarm when a first prescribed period of time has elapsed after the sampling mode is started by said sampling mode setting means or when the high level sensor of said header detects a high liquid level, and discontinue said sampling mode after the lapse of a second prescribed period of time after issuance of said alarm.

4. An absorption cold/hot water generating machine claimed in claim 3, wherein the alarm issued by said alarm-sampling mode stop means is discriminated from other alarms by a change in sound of a buzzer.

* * * * *